United States Patent [19]
Druckman

[11] Patent Number: 5,976,018
[45] Date of Patent: Nov. 2, 1999

[54] JOYSTICK ADAPTER

[75] Inventor: Gil Druckman, Tel Aviv, Israel

[73] Assignee: Tiger Electronics, Ltd., Vernon Hills, Ill.

[21] Appl. No.: 08/795,913

[22] Filed: Feb. 5, 1997

[51] Int. Cl.[6] .................................................. A63F 9/22
[52] U.S. Cl. ................................ 463/47; 463/46; 463/38; 273/148 B
[58] Field of Search ......................... D21/48; 273/148 B; 463/36–38, 46, 47; 206/576, 557, 305; D28/333; D14/114

[56] References Cited

U.S. PATENT DOCUMENTS

| | | |
|---|---|---|
| D. 366,910 | 2/1996 | Hsieh . |
| 4,575,591 | 3/1986 | Lugaresi . |
| 4,786,768 | 11/1988 | Langewis et al. . |
| 4,945,357 | 7/1990 | Tal . |
| 5,034,574 | 7/1991 | Martovitz . |
| 5,343,219 | 8/1994 | DuBosque, Jr. . |
| 5,409,107 | 4/1995 | Browne ................................ 206/305 |
| 5,467,108 | 11/1995 | Mimlitch . |
| 5,510,810 | 4/1996 | Nishijima et al. . |
| 5,541,622 | 7/1996 | Engle et al. . |

FOREIGN PATENT DOCUMENTS

| | | |
|---|---|---|
| 4428671 | 2/1995 | Germany . |
| 9531263 | 11/1995 | WIPO . |

*Primary Examiner*—Michael O'Neill
*Attorney, Agent, or Firm*—Fitch, Even, Tabin & Flannery

[57] ABSTRACT

An electronic game having a display screen for viewing of images generated by the internal circuitry of the game is provided. The game includes player controls for interactively playing the game with one of the controls being a multi-directional control key which can be used to control movements of an image on the screen for playing the game. The game has a joystick adapter which allows a joystick to be used in lieu of the control key for controlling image movement. Preferably, the joystick adapter includes a releasable snap-fit attachment between the joystick and control key to allow the joystick to be readily snapped into an operative position on the key for pivoting the key with the joystick. The game can also include mounting clips for receiving the joystick when it is not being used in a stored position attached to the game housing. The joystick can be configured in the form of an action figure to enhance its appeal to youngsters.

19 Claims, 6 Drawing Sheets

JOYSTICK ADAPTER

FIELD OF THE INVENTION

The invention relates to electronic games, and more particularly, to electronic games which have a control key for controlling movement of an image displayed on the display screen of the game.

BACKGROUND OF THE INVENTION

Interactive video games such as found in video game arcades have long been popular where players can exercise some degree of control over the action viewed on the screen of the game. Such control can include controlling movement of images or characters in a precise manner so as to accomplish predetermined goals as set out by the scheme of the game. For example, video games can include various types of control keys which allow a character to be moved to avoid being hit, such as by another image generated by the game program or by projectiles, missiles, etc., while at the same time allowing the player to control the image to selectively engage other characters on the screen or shoot or throw projectiles of its own at target images, such as at other characters or obstacles generated on the game screen.

The types of controls used on video games include multi-directional control keys to be mounted to the game so that when a player pushes on a portion of the key, the key pivots in response to the pressure towards the direction of desired image movement. Some control keys allow the image to move in four directions, such as right and left and up and down on the screen. The use of multi-directional joystick controls for controlling image movement are also known, and similar to the above-described control key, work to control image movement depending on how the joystick is pushed or pulled by the player. Other common types of controls include the use of directional buttons which can be positioned adjacent each other so that a player can utilize the fingers of one hand to push on the button corresponding to the direction of movement desired, and also roller balls wherein the player simply rolls the ball towards the direction of movement desired for the image.

With the progress in miniaturization of integrated circuits, the ability to provide hand-held video games that include game schemes comparable to that of regular stand-alone arcade video games has improved. However, with hand-held video games, the space taken up by the game housing and the player controls thereon are still significant design factors that must be considered. Thus, the provision of joysticks on hand-held video games is typically not done. Instead, the use of the previously-described player controls such as keys and buttons are normally utilized. However, where a player does not have sufficient tactile control, such as with younger players, it can be difficult for them to coordinate precise manipulation of the keys and buttons for them to properly realize full enjoyment of the game. Thus, it would be desirable to provide a video game where a player has the option of either utilizing the player controls such as a control key, or in lieu of the control key, a joystick for controlling image movement on the video display screen.

SUMMARY OF THE INVENTION

In accordance with the present invention, an electronic game is provided in which the players can exercise control of movements of an image generated on the display screen of the game by either utilizing a control key or a joystick attached to the control key. In this regard, the electronic game is provided with a joystick adapter where the control key is provided with an opening for receiving a portion of the joystick therein and there is a releasable attachment provided between the key and joystick in the key opening which allows the joystick portion to be inserted in the key opening and to be releasably locked therein for using the joystick to pivot the control key. Thus, the present invention gives the player the option of whether to use the control key or the joystick for controlling image movement while playing the game.

The present invention provides significant flexibility in how the electronic game of the present invention is to be played. Where the player has a sufficient degree of skill so that the use of a joystick is unnecessary, the joystick can be removed from the control key so that the players can use the control key for controlling image movements on the display screen of the game. Where the player does not have the requisite degree of coordination to properly manipulate the keys or simply desires to use a joystick, the present invention allows a joystick to be releasably attached to the key so that manipulating the joystick also manipulates the key for controlling image movement on the game display screen.

Accordingly, in one form of the invention, an electronic game is provided having a housing including a display screen and circuitry for generating images on the screen. The game further includes player controls to control playing of the game including movement of at least one of the images generated on the game screen and having a joy stick adapter to allow a joystick to be used for controlling image movement. The joystick adapter includes a control key of the player controls for moving the at least one image on the screen. The control key is pivotally mounted to the housing so that when a player pushes on a portion of the key, the key pivots in a direction corresponding to the direction of image movement. An opening on the key can receive a portion of the joystick therein. A releasable attachment between the key and joystick is provided in the key opening to allow the joystick portion to be inserted in the key opening and to be releasably locked therein for using the joystick to pivot the control key. The control can include a top surface and the key opening can be a central recess formed in the key top surface into which the joystick portion can be releasably attached.

In a preferred form, the control key includes a depending portion having a curved bottom engaging and pivotally mounted on an interior surface of the housing. The housing interior surface on which the curved bottom of the depending portion is pivotally mounted can be the surface of a printed circuit board with the printed circuit board including switch circuits which are closed by pivoting of the control key about the depending portion curved bottom.

In another form of the invention, an electronic game having a display screen and circuitry for generating a movable image on the screen is provided with the electronic game including a housing of the game including an interior and an exterior with the movable image on the display screen being viewable from the exterior of the housing and the circuitry being in the interior of the housing. A multi-directional control key is mounted to the housing to be accessible at the exterior thereof to a player. The key is connected to the game circuitry for controlling movement of the movable image in a plurality of directions on the screen. A joystick control is provided for actuating the control key when placed in an operative position thereon. A releasable attachment is provided between the control key and the joystick control allowing the joystick control to be attached to the control key in the operative position to actuate the key for controlling the key for controlling the movement of the image in the plurality of directions on the screen, and to be released from attachment with the control key with the control key being directly actuated by a player for controlling the movement of the image in a plurality of directions on the screen.

In one form, the joystick control includes a mounting post depending therefrom and the control key includes a central recess for receiving the mounting post with the joystick control in its operative position. Snap fit structure on the post and the key in the central recess thereof allows the mounting post to be inserted into the central recess and to be removably captured therein with the joystick control in its operative position.

In another form, one of the joystick post and key recess includes a raised portion and the other of the joystick post and key recess includes a grooved portion in which the raised portion is tightly received by a snap fit formed by the post and key recess raised and grooved portions with the joystick control in its operative position. The joystick control can include a support stand having top and bottom surfaces with the mounting post depending from the stand bottom surface and having ribs extending radially outward from the mounting post along the bottom surface of the stand. The control key can include a top surface in which the recess is centrally formed and having slots extending radially outward from the central recess. The support stand ribs seat in the slots with the joystick control placed in its operative position on the control key to prevent turning of the joystick control relative to the control key with the raised portion received by the snap fit in the grooved portion.

The joystick control can include an upper gripping portion extending upwardly from its support stand for being gripped to move the joystick control and control key with the joystick control in its operative position. The gripping portion can have a predetermined shape in the form of an action figure so as to make the use of the joystick more attractive to younger players.

In a preferred form of the invention, a hand-held electronic game is provided including a housing having internal game circuitry and a display screen for viewing images generated by the game circuitry during playing of the game, a control key on the game housing and connected to the circuitry for moving an image on the screen and a joystick having first and second attached positions on the game with the first attached position being an operative position with the joystick attached on the control key for controlling movement of the image on the screen by operation of the joystick, and the second attached position being a stored position with the joystick attached to the housing and operation of the control key controlling movement of the image on the screen. Thus, the joystick can be removed and placed in its stored position so that the joystick will remain with the game even when the control is directly being utilized and pressed to move the image on the game screen, thus reducing the chance of losing the joystick when it is not being used.

In one form, the housing includes joystick mounting clips for receiving and holding the joystick in the clips to store the joystick in the joystick second attached position when the control key is being operated for controlling image movement. The housing can include clip receiving openings and have a first half and a second half thereof which when attached together tightly capture the mounting clips in the clip receiving openings thereof.

DETAILED DESCRIPTION OF THE PREFERRED EMBODIMENT

Figure 1:
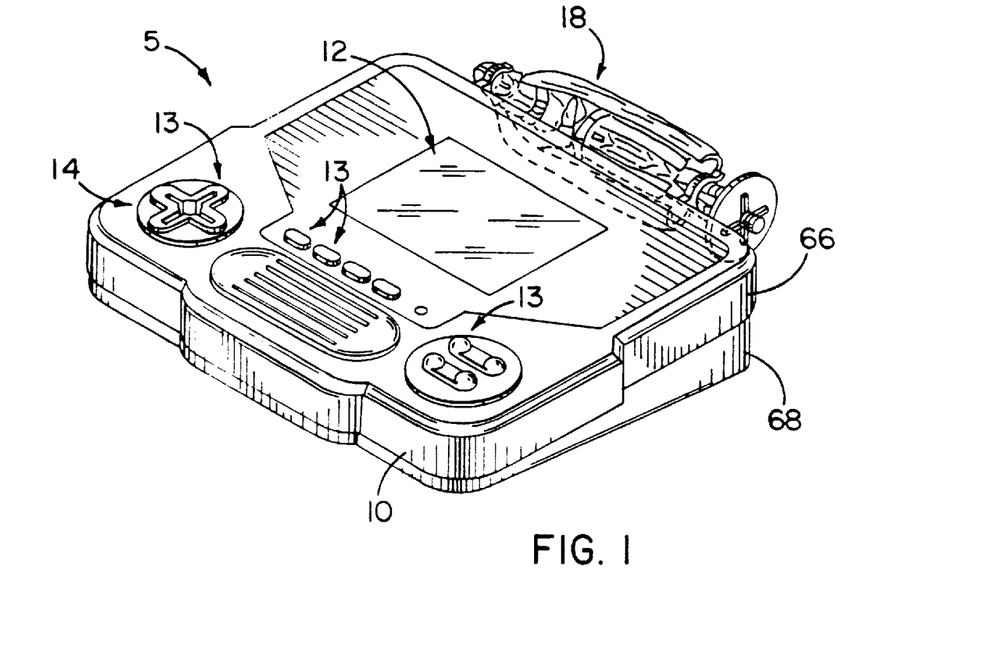
FIG. 1 is a perspective view of an electronic game having a display screen according to the present invention and showing the joystick in its stored position with a control key being accessible to the player for use in controlling movements of an image on the game display screen.
Figure 2:
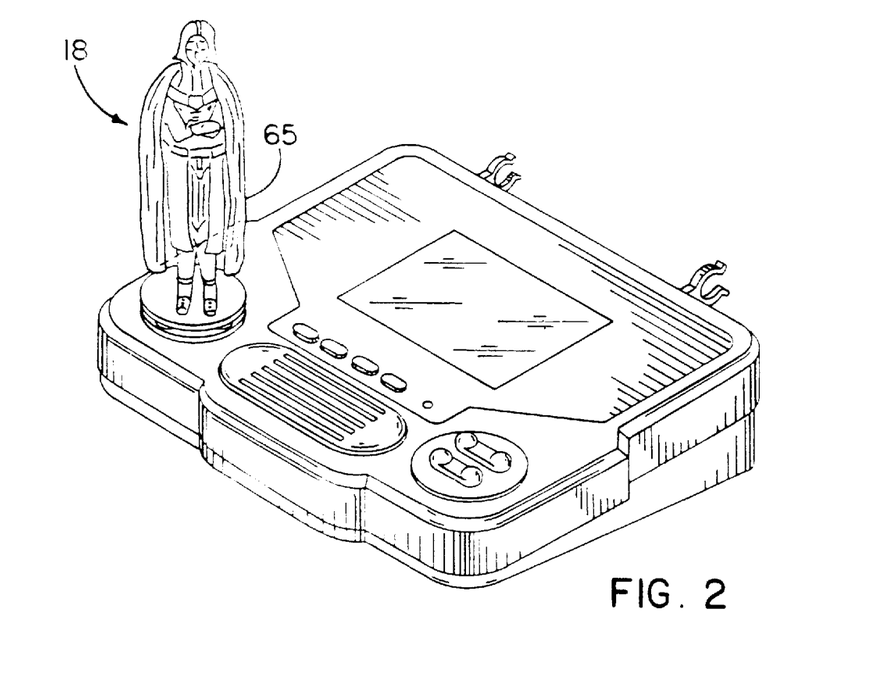
FIG. 2 is a perspective view similar to FIG. 1 showing the joystick removed from the stored position to an operative position attached on the control key to use the joystick for controlling image movement.

In FIG. 1, a preferred form of an electronic hand-held game 5 according to the present invention is illustrated. The hand-held game 5 includes a housing 10 with an interior and an exterior thereof. A video display screen 12 is provided for displaying images in accordance with the programmed game scheme when the game 5 is being played and is viewable by the player from the exterior of the housing 10. Internal circuitry (not shown) is provided in the interior of the electronic game housing 10 to generate the images shown on the screen 12. Controls 13 which can be manipulated or pressed by the player for playing the game 5 are provided on the exterior of the housing 10 accessible to the player. Movement of at least one of the images can be controlled by one of the player controls 13 in the form of a multi-directional control key 14. The game 5 has a joystick adapter 16 (FIG. 3) so that a joystick 18 can be utilized in lieu of the control key 14 for moving the movable image displayed on screen 12. Although the game 5 is shown as a relatively compact hand-held game for use with the joystick adapter 16 provided herein, it will be recognized that the joystick adapter 16 can also be used in the larger stand-alone video arcade games as well. The provision of the joystick adapter allows a player to choose between use of the control key 14 or the joystick 18 while playing the game 5 for controlling image movement on the display screen 12. The significant flexibility provided by the joystick adapter 16 is particularly important where younger players who do not have their motor skills sufficiently developed for proficiently utilizing touch control keys, can more easily and proficiently use a joystick control 18. Such younger players can simply remove the joystick 18 from its stored location on the game housing 10 (FIGS. 1 and 6) and place into the joystick adapter 16 on the control key 14 (FIG. 2) to allow them to more proficiently play the game 5 utilizing the joystick 18, as will be more particularly described herein.

Figure 3:
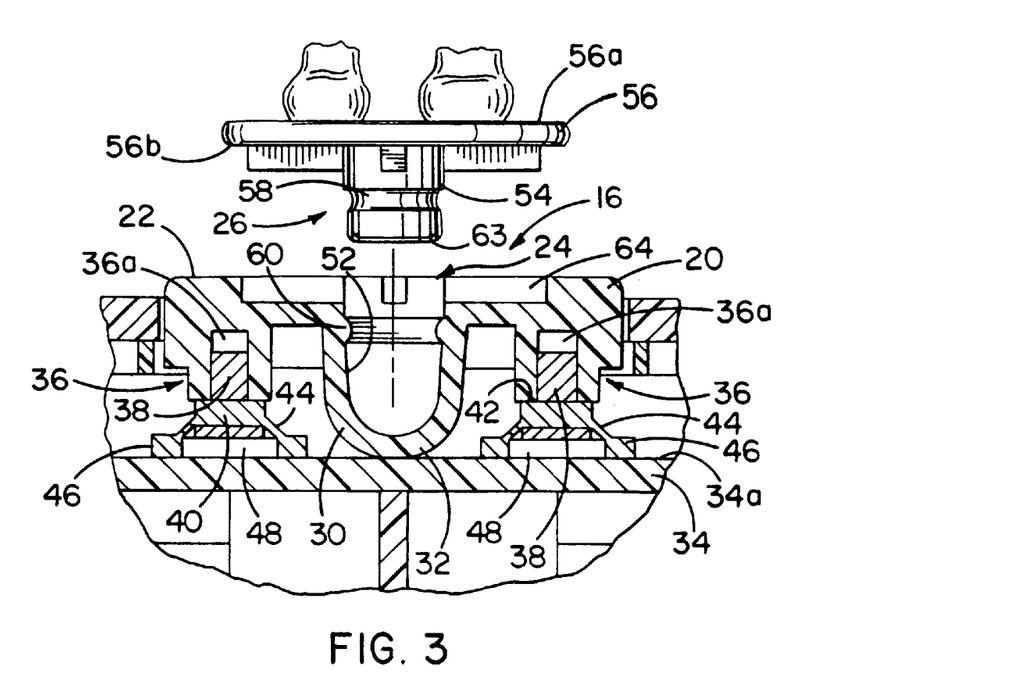
FIG. 3 an enlarged fragmentary sectional view of the control key and a lower portion of the joystick before being releasably attached to the key.

Referring to FIG. 3, the joystick adapter 16 is shown and preferably includes a portion thereof in the control key body 20 and another portion thereof on a lower portion 26 of the joystick control 18. The key body 20 has a top surface 22 with a central opening 24 formed therein for receiving the lower portion 26 of the joystick 18 to connect the joystick 18 to the control key 14 as by releasable attachment 28 formed therebetween, as best seen in FIG. 4.

More specifically, the control key 14 includes a central depending portion 30 having a curved bottom 32 which engages and is pivotally mounted on top surface 34a of a printed circuit board (PCB) 34 positioned in the interior of the game housing 10. The key body 20 can be provided with four annular mounting bosses 36, two of which are shown in FIGS. 3 and 4. The mounting bosses 36 each define an annular space 36a. The circuit board 34 includes electronic circuitry for the game 5 such as switch circuits including switch contacts thereon (not shown) below the mounting bosses 36 of the control key 14. Switch caps 37 are mounted over the PCB switch contacts and can be formed from a conductive rubber material. The mounting bosses 36 receive upright portions 38 of the caps 37 in their spaces 36a so that when the portion of the key top surface 22 over a particular mounting boss 36 is depressed sufficiently against the bias of the associated rubber caps 37, the conductive rubber material of the cap 37, and in particular contact portion 37a thereof, will contact the switch contacts provided on the circuit board 34 to close the switch circuit to provide four momentary switches which are operable by pivoting of the control key 14. Other means for providing the directional control utilizing control key 14 will be apparent to those skilled in the art and are also within the purview of the present invention.

Figure 4:
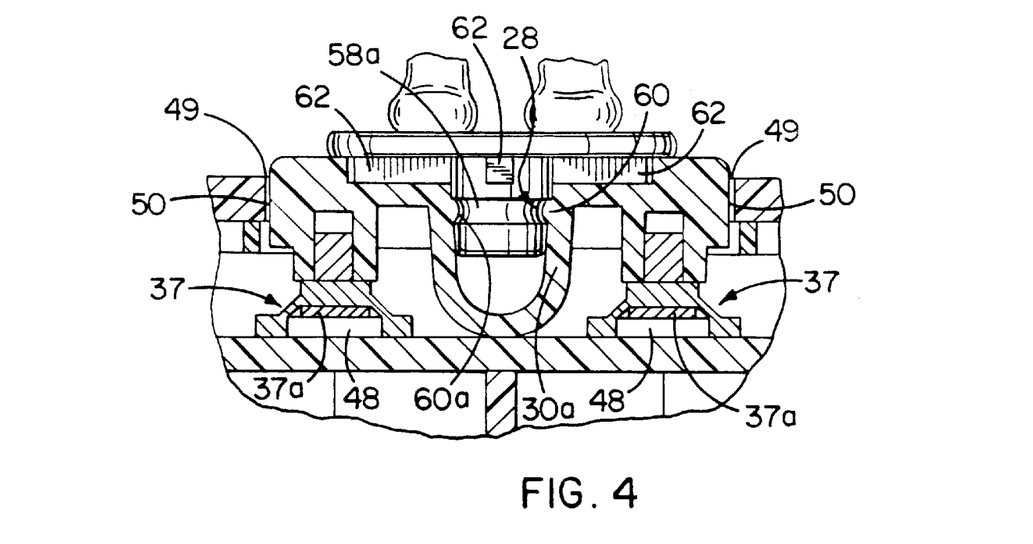
FIG. 4 is a view similar to FIG. 3 showing the joystick lower portion releasably attached to the control key.

As can be seen in FIGS. 3 and 4, the switch caps 31 include an upper base portion 40 above which the upright portion 38 projects into the space 36a of the bosses 36 with there being a shoulder 42 formed between the base 40 and the upright portion 38 onto which the bottoms of the bosses 36 are seated. The base 40 is biased upwardly by an inclined shell portion 44 of the cap rubber material with the caps 37 being electrically attached at their bottom to the PCB switch circuitry by annular lower foot portion 46 so that there is a space 48 between the switch contacts on the circuit board 36 and the cap contact portion 37a attached to the bottom of the base 40. Thus, when the player pushes down on the portion of the top surface 22 of the control key body 20 over one of the switches, the bottom of the corresponding mounting boss 36 pushes on the shoulder 42 collapsing the shell portion 44 to push the contact portion 37a on the bottom of the base 40 through the space 48 into contact with the switch contact on the circuit board 34 to close the momentary switch until the key 22 is released or pressed at another location thereon. As the shell portion collapses, the key 14 is allowed to pivot about the curved bottom 32 of the key depending portion 30 with there being sufficient room or space 49 provided between sides of the top wall of the game housing 10 and the key peripheral annular surface 50 to accommodate the requisite pivoting action of the control key 14.

The releasable attachment 28 provided between the key 14 and the joystick 18 can be in the form of snap-fit structure provided on the joystick lower portion 26 and the control key depending portion 30. More specifically, the key opening 24 is a central annular recess 52 defined by the key depending portion 30, and the joystick lower portion 26 is in the form of a mounting post 54 depending from a support stand 56 for the joystick 18. The stand 56 extends transversely relative to the mounting post 54 and has top and bottom parallel surfaces, 56a and 56b, which can have a circular shape with the mounting post 54 depending centrally from the stand bottom surface 56b. The mounting post 54 has a diameter substantially corresponding to the diameter across the central annular recess 52 so that the mounting post 54 is tightly received therein. The mounting post 54 can have an annular groove 58 formed thereon at a predetermined distance below the bottom of the support stand 56. The depending portion 30 has a substantially annular wall 30a extending up from the bottom portion 32. An annular raised portion or bead 60 is formed on the wall 30a and projects radially into the recess 52 defined by the depending portion 30. The bead 60 is formed at a predetermined distance from the key top surface 22. The groove 58 and bead 60 have cooperating arcuate surfaces 58a and 60a, respectively, which have complementary shapes so that the bead 60 can seat snugly within the groove 58 when the mounting post 54 is inserted into the annular recess 52 for releasably attaching or locking the joystick 18 in its operative position on the control key 14.

Continuing with reference to FIGS. 3 and 4, the support stand 56 has ribs 62 formed on its bottom surface 56b extending radially outward from the joystick mounting post 54, and the control key 14 has corresponding radial slots 64 in the key top surface 22 which extend radially outward from the key central opening or recess 52. When the joystick 18 is snapped into the control key 14 in its operative position thereon, the seating of the ribs 62 in the slots 64 prevents the joystick 18 from turning relative to the control key 14 when being pulled or pushed by a player for moving the image on the game screen 12.

The predetermined distance at which the post groove 58 is located from the bottom surface 56b of the support stand 56 and the predetermined distance of the bead 60 in the annular recess 52 from the key surface 22 is such that when the mounting post 54 is snap fit into the recess 52 with the bead 60 tightly seated in the groove 58, as shown in FIG. 4, the stand bottom surface 56b will rest on the key top surface 22 so that pivoting the joystick 18 will tip or pivot the stand 56 thereof with the portion of the stand 56 tipping down pushing on the corresponding portion of the key surface 22 therebelow, thereby transmitting the pivoting action of the joystick 18 to the control key 14 for controlling image movement on the game screen 12.

As previously mentioned, the post 54 is snap fit into the recess 52 by way of arcuate surfaces 58a formed in the groove 58 and complementary arcuate surfaces 60a formed on the bead 60. Thus, when inserting the post 54 into the recess 52, the bottom chamfered end 63 of the post 54 will initially engage and cam against the upper portion of the arcuate surface 60a. As the housing and control key are preferably formed from a plastic material, such as ABS, the ABS material of the key body 20 will deform slightly radially outward to allow the post bottom end 63 to move past the upper portion of the curved surface 60a with the curved surface 60a then camming against the post annular surface 67. Continued insertion force eventually will cause the curved surface 60a to be radially aligned with post groove 58 to allow the wall 30a to rebound to its original undeformed configuration with the curved surface 60a camming and snapping into engagement with the groove surface 58a as the ribs 62 are being seated in their corresponding slots 64, as seen in FIG. 4. To separate the joystick 18 from the control key 14, the reverse operation is performed with one or both of the joystick 18 or the housing 10 being pulled away from one another so as to exert a separation force sufficient enough to cause the groove curved surface 58a to cam over the lower portion of the bead curved surface 60a deforming the depending portion walls 30a radially outward until the post bottom end 66 clears the bead 60 to release the joystick 18 from its snap fit lock with the control key 14.

Thus, with the joystick adapter 16 herein, the present electronic game 5 provides users of all ages with the opportunity to play the game 5 in a manner which best suits their abilities. With smaller children, the joystick 18 can be snap fit into the control key opening 24, whereas with older children, the joystick 18 can be removed from the control key 14 and placed in a stored position attached to the game housing 10. The joystick 18 is particularly suited for younger children as it can be provided with a gripping portion 65 attached to and extending up from the stand top surface 56 with the gripping portion 65 being provided with a predetermined shape such as in the form of an action figure, such as the Darth Vader® configuration illustrated herein.

Inasmuch as the joystick 18 is adapted to be removed from the control key 14 such as when the game 5 is not being played or the key 14 is being directly used to control image movements, the joystick 18 herein is provided with two different attached positions to the housing 10. In the first attached position or operative position, the joystick 18 is snapped into the key 14 for playing of the game 5 using the joystick 18. In the second attached position, or stored position, the joystick 18 is snapped out from the key 14 for attachment to the housing 10 at a different location as described hereinafter.

Figure 5:
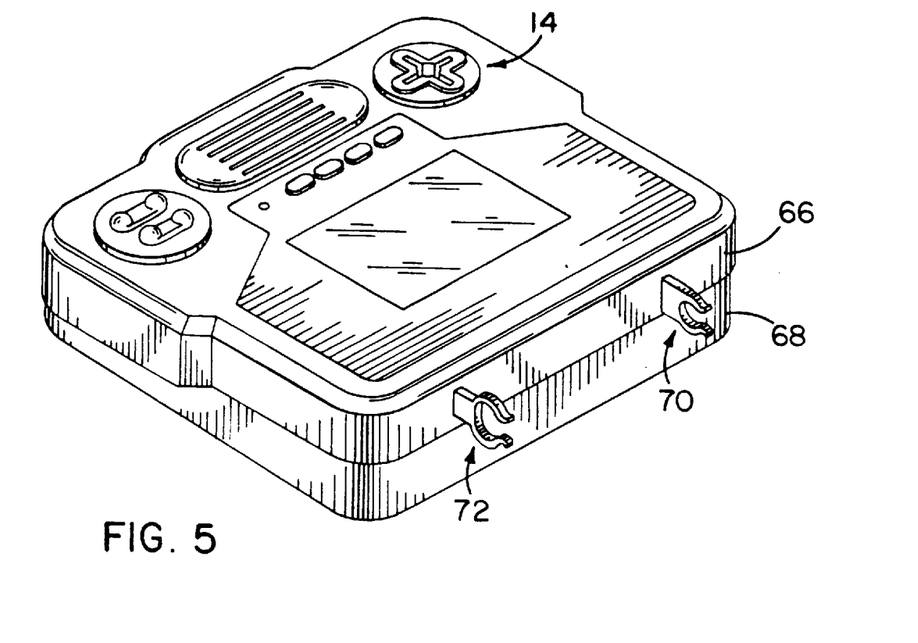
FIG. 5 is a rear perspective view of the electronic game showing mounting clips for receiving the joystick in the stored position.
Figure 6:
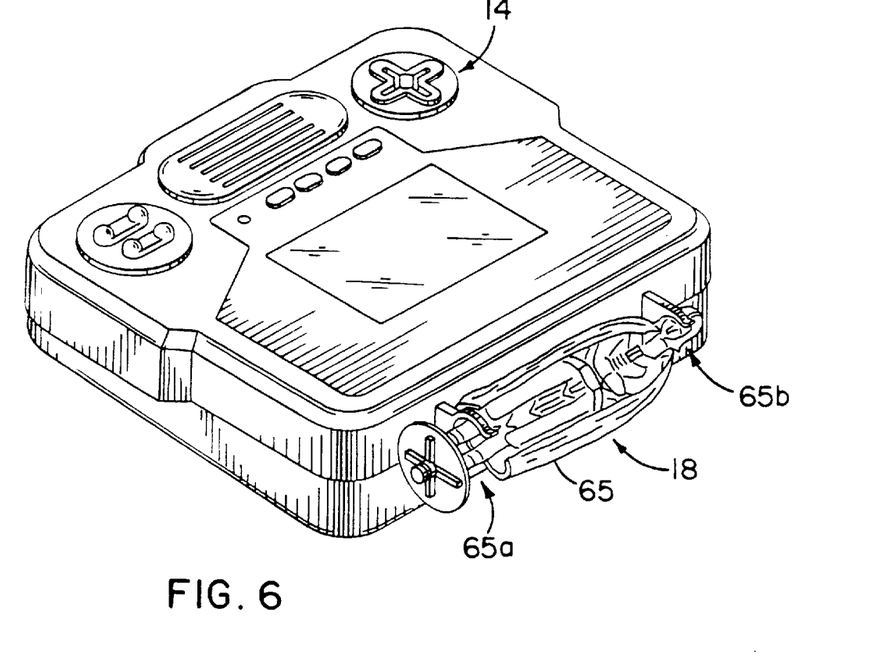
FIG. 6 is a rear perspective view similar to FIG. 5 showing the joystick attached in the mounting clips in the stored position.
Figure 7:
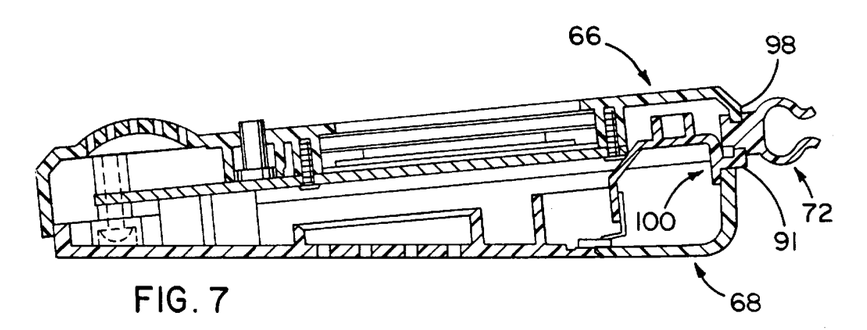
FIG. 7 is a side sectional view of the assembled housing of the electronic game according to the present invention.

Turning to FIGS. 5 and 6, the second attached or stored position of the joystick 18 will next be described. The game housing 10 preferably is constructed from first and second housing halves 66 and 68, respectively, with the first housing half 66 being the upper housing portion and the second housing half 68 being the lower housing portion. At the rear of the housing 10, a pair of plastic mounting clips 70 and 72 are provided, as best seen in FIG. 5. The clips 70 and 72 are adapted to receive the joystick 18 between jaws thereof in the stored position, as shown in FIG. 6.

Figures 8A, 8B, 9:
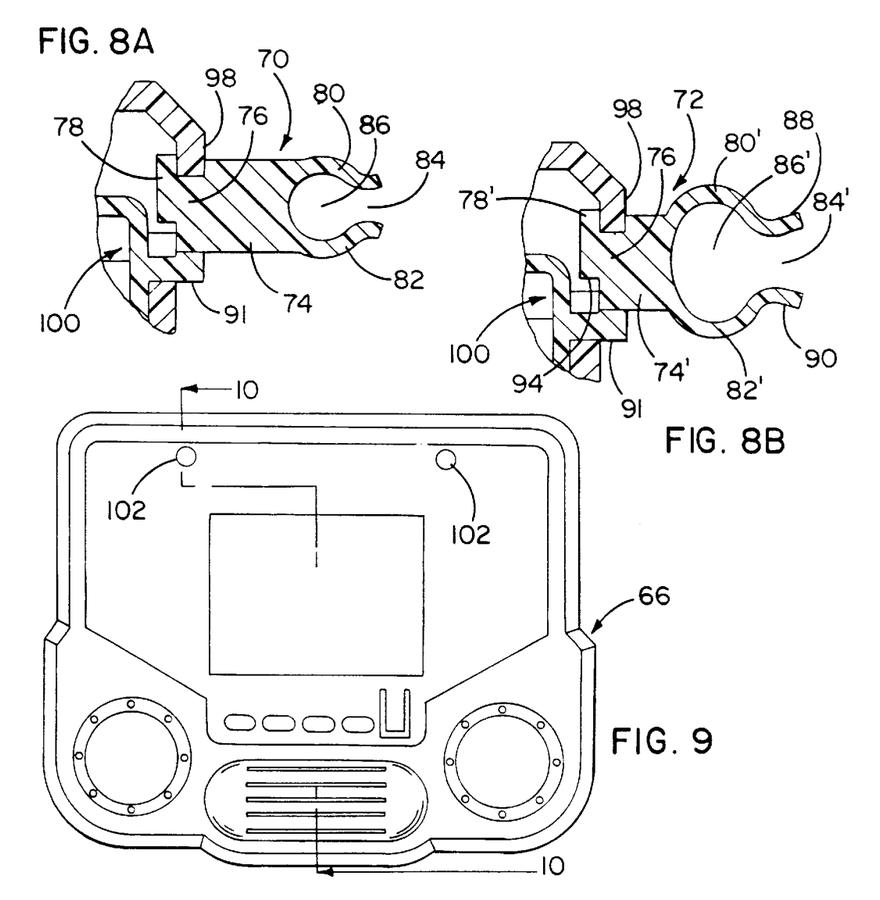
FIG. 8A is an enlarged fragmentary sectional view of the mounting of one of the clips to the game housing.
FIG. 8B is an enlarged fragmentary sectional view of the mounting of the other clip to the housing.
FIG. 9 is a top plan view of a top half of the game housing.
Figure 10:
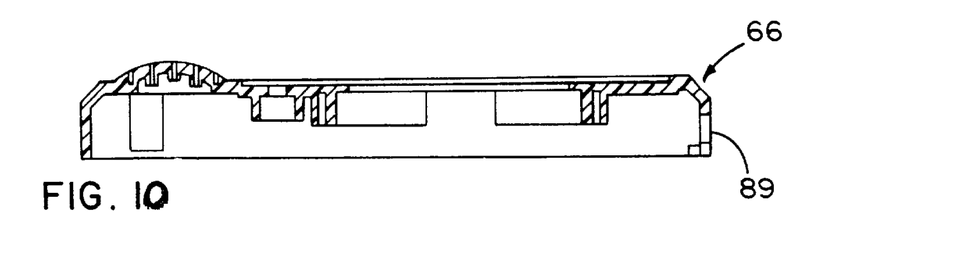
FIG. 10 is a side sectional view taken along line 10—10 of FIG. 9 of the housing top half.
Figure 11:
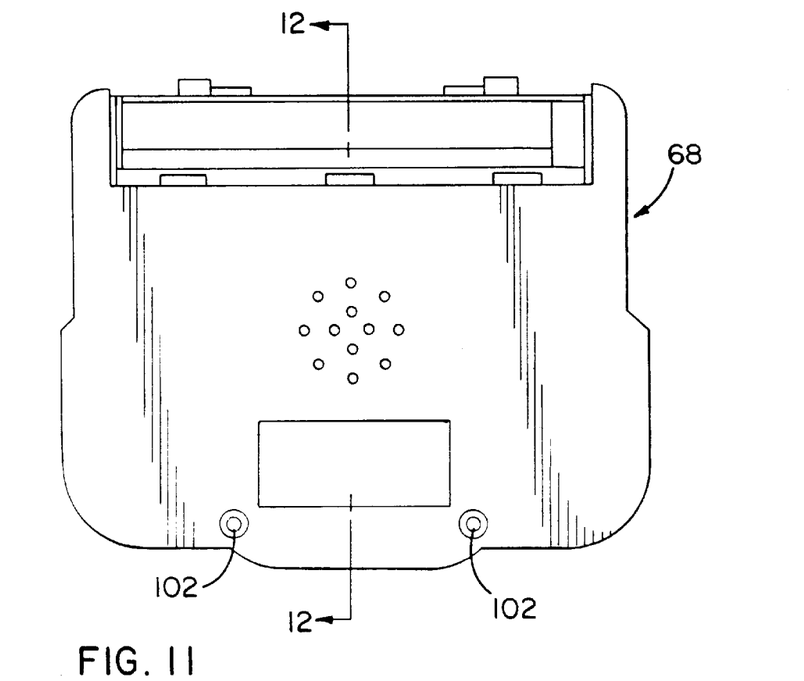
FIG. 11 is a bottom plan view of a bottom half of the game housing.
Figure 12:
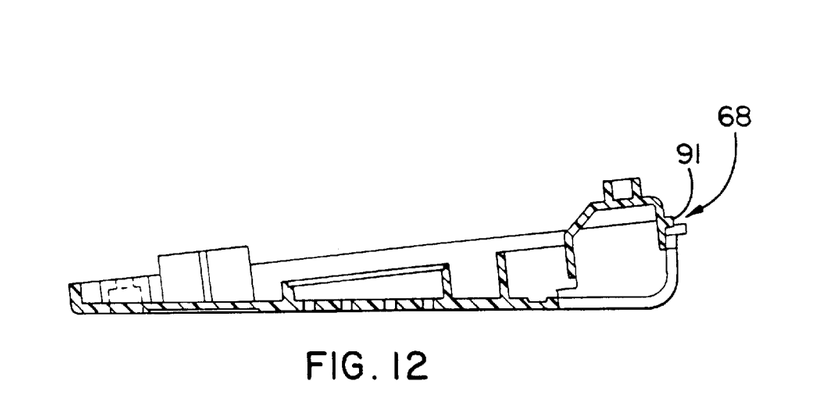
FIG. 12 is a side sectional view taken along line 12—12 of FIG. 11.

Referring to FIG. 8A, the mounting clip 70 has a main body portion 74 connected to an intermediate mounting block portion 76 which in turn is connected to the back mounting plate portion 78 of the clip 70. At the front of the main body portion 74, opposed arcuate resilient jaws 80 and 82 are provided which define a small entry opening 84 at their distal ends leading to a larger joystick-receiving space 86 between curved portions of the jaws 80 and 82. The jaws 80 and 82 can be resiliently expanded at their distal ends to enlarge the entry opening 84 for tightly receiving a portion of the joystick 18 between the jaws 80 and 82 in the space 86 provided therebetween. Mounting clip 72 as shown in FIG. 8B is provided with a similar construction to mounting clip 70 with corresponding reference numerals given a prime (') to indicate their association with mounting clip 72. Thus, mounting clip 72 likewise has a main body portion 74', a mounting block portion 76' and a mounting plate portion 78'. The flexible jaws 80' and 82' also define an entry opening 84' therebetween at their distal ends which leads to a joystick receiving space 86' between curved portions of the jaws 80' and 82'. As can be seen by a comparison of FIGS. 8A and 8B, the jaws 80' and 82' preferably have a greater curve than jaws 80 and 82 so that mounting clip 72 is adapted to receive a thicker portion of the joystick therein between its jaws 80' and 82'. This can be necessary where the joystick 18 has its upper portion 65 configured in the shape of an action figure so that the size of the gripping portion 65 varies along its length. In this regard, the jaws 80' and 82' at their distal ends can be provided with flared-out portions 88 and 90, respectively, so that the entry opening 84' initially is slightly larger than the initial entry opening 84 for the mounting clip 70. This allows the foot region 65a of the action figure joystick 65 to be inserted in clip 72 while the smaller head region 65b can be inserted in clip 70, as best seen in FIG. 6.

For mounting the clips 70 and 72 to the housing 10, the top housing half 66 can have a pair of clip receiving openings in the form of inverted T-slots 89 formed therein and the bottom housing half 68 has a ledge 91 so that when the housing 10 is assembled, the ledge 91 cooperates to capture the clips 70 and 72 in the slots 89, as will be more fully described herein. Returning to the construction of the clips 70 and 72, the mounting block 76 is slightly narrower than the width of clip main body portion 74 so as to form a vertical shoulder 92 therebetween on either side of the back of the main body portion 74 to which the mounting block 76 is connected. The mounting plate portion 78 is attached to the back of the mounting block 76 and extends laterally widthwise beyond both the sides of the mounting block 76 and the sides of the body portion 74 of the clips and thus forms a shoulder 93 with the mounting block 76. The plate 78 is connected to the block 76 at a location above the bottom of the block 76 so as to form a horizontal shoulder 94 between the plate 78 and the block 92. In addition, since the block 76 does not extend to the height of the main body portion 74, a channel 96 between the front surface of the plate 78 and the back surface of the body portion 74 is formed over the top of the block 76.

The top housing half 66 can have a substantially vertical rear wall 98 having a thickness corresponding to the distance across the channel 96 between the front of the plate portion 78 and the rear of the body portion 74. The inverted T-slot 89 is formed in the vertical rear wall 98 and can have a vertical portion 89a of the slot 89 which has a width slightly larger than the width of the clip mounting block 76. Thus, to assemble the game housing 10 with the clips 70 and 72 mounted in their respective slots 89, the clips mounting block portion 76 is slid in the vertical portion 89a of the slot until the top of the block 76 engages against the top of the slot portion 89a with the portion of the rear wall 98 above the slot vertical portion 89a tightly received in the channel 96 between the front of the mounting plate 78 and the back of the body portion 74 and the portions of the rear wall 98 on either side of the slot vertical portion 89a received tightly between the body shoulders 92 and the plate shoulders 93.

Figure 13:
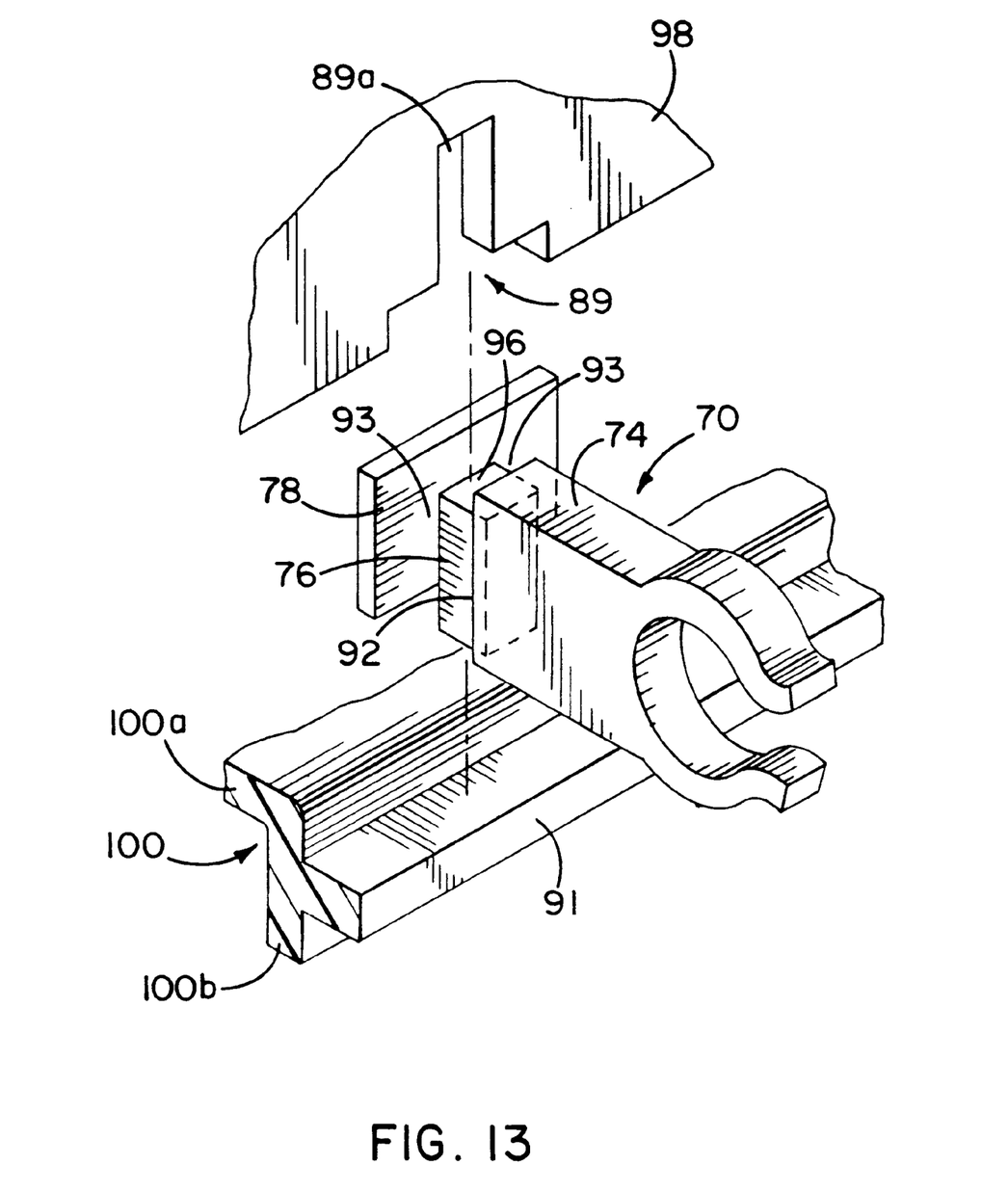
FIG. 13 is an enlarged fragmentary perspective view of the mounting of the clip of FIG. 8A to the housing.

The lower housing half 68 includes a right angle wall 100 at the rear thereof having a substantially horizontal portion 100a integral with a substantially vertical portion 100b. The ledge 91 extends integrally outwardly from the vertical portion 100b intermediate the top and bottom thereof, as best seen in FIG. 13. Fastener mounting bosses 102 are provided at various locations around the upper and lower housing halves 66 and 68 so that when aligned with one another, the bosses 102 can receive fasteners therein to clamp the housing halves 66 and 68 together for assembly of the game housing 10. With the mounting bosses 102 aligned for assembly of the game housing 10, the right angle wall 100 of the lower housing half 68 will be spaced inwardly from the vertical rear wall portion 98 of the upper housing half 66 with the ledge 91 extending out to a point in vertical alignment with the vertical rear wall portion 98, as best seen in FIGS. 8A and 8B. When the housing halves 66 and 68 are fastened together and the clips 70 and 72 are slid into the inverted T-slots 89 as previously described, the ledge 91 will cooperate to engage the bottom of the clip mounting block portion 76 and clamp it up against the bottom of the vertical rear wall portion 98 in the channel 96, i.e., against the top of the slot vertical portion 89a, to securely capture the mounting clips 70 and 72 in the clip-receiving openings or slots 89 of the game housing 10.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

I claim:

1. An electronic game having a housing with a display screen and circuitry for generating images on the screen, the game further including player controls to control playing of the game including movement of at least one of the images and having a joystick adapter to allow a joystick to be used for controlling image movement, the joystick adapter comprising:

a multi-directional control key for moving the at least one image on the screen and being pivotally mounted to the housing so that when a player pushes on an upper surface portion of the control key, the control key pivots in one of a plurality of directions corresponding to the direction of image movement on the screen;

an opening centrally disposed on the control key for receiving a portion of the joystick therein and defining a central axis extending therethrough and generally normal to the control key upper surface portion; and a releasable attachment between the control key and joystick in the control key opening to allow the joystick portion to be inserted in the control key opening to directly engage an interior portion of the control key in the opening thereof for being releaseably locked therein via the releasable attachment for using the joystick to pivot the control key with the joystick generally being aligned along the control key opening central axis.

2. The joystick adapter of claim 1 wherein the control key includes a top surface and the control key opening is a central recess in the control key top surface into which the joystick portion can be releasably attached.

3. The joystick adapter of claim 1 wherein the control key includes a depending portion including the interior portion and having a curved bottom pivotally mounted on an interior surface of the housing for pivoting of the control key.

4. The joystick adapter of claim 3 wherein the interior surface is on a printed circuit board with the printed circuit board including switch circuits which are closed by pivoting of the control key.

5. An electronic game having a display screen and circuitry including switches for generating a movable image on the screen, the electronic game comprising:

a housing of the game including an interior and an exterior with the movable image on the display screen being viewable from the exterior of the housing and the circuitry being in the interior of the housing;

a multi-directional control key having upper and lower portions and mounted to the housing so that the control key upper portion is accessible at the exterior of the housing to a player and the control key lower portion operates the switch circuitry for controlling movements of the movable image in a plurality of directions on the screen;

a mechanical joystick control for actuating the control key when placed in an operative position thereon;

a support stand of the joystick for engaging on the top of the control key upper portion with joystick in its operative position;

a mounting post portion of the joystick depending from the support stand;

ribs on the bottom of the support stand extending radially outward from the mounting post portion;

a releasable attachment between the control key and the joystick control allowing the joystick control to be attached to the control key in the operative position to actuate the key for controlling the movement of the image in the plurality of directions on the screen, and to be released from attachment with the control key with the control key being directly actuated by a player for controlling the movement of the image in the plurality of directions on the screen;

an opening centrally disposed on the control key for receiving the mounting post portion of the joystick therein and defining a central axis extending therethrough with the releasable attachment located in the control key opening and the joystick generally being aligned along the control key opening central axis when releaseably attached in the opening; and slots extending radially outward from the central opening with the joystick ribs seating in the control key slots with the joystick in its operative position to prevent turning of the joystick control relative to the control key.

6. The electronic game of claim 5 wherein the multi-directional control key is pivotally mounted to the game housing and includes a top surface for being pushed to pivot the control key based on the portion of the top surface pushed in a direction corresponding to the desired direction of movement of the image on the screen.

7. The electronic game of claim 5 wherein the joystick control includes a mounting post depending therefrom and the control key includes a central recess for receiving the mounting post with the joystick control in its operative position, and snap fit means are provided between the post and the control key in the central opening thereof for allowing the mounting post to be inserted into the central opening and be removably captured therein with the joystick control in its operative position.

8. The electronic game of claim 5 wherein one of the joystick post and the control key opening includes a raised portion and the other of the joystick post and the control key opening includes a grooved portion in which the raised portion is tightly received by a snap fit between the post and the control key opening raised and grooved portions with the joystick control in its operative position.

9. The electronic game of claim 5 wherein the joystick control includes a support stand for seating on the control key with the joystick control in its operative position, and an upper gripping portion extending upward from the stand for being gripped to move the joystick control and control key with the joystick control in its operative position and having a predetermined shape in the form of an action figure.

10. The electronic game of claim 5 wherein the housing includes clips mounted to the exterior thereof for storing the joystick control when it is removed from its operative position on the control key.

11. The electronic game of claim 10 wherein each of the clips includes a mounting foot and the housing has corresponding openings in which the feet are captured.

12. A hand-held electronic game comprising:
   a housing having internal game circuitry and a display screen for viewing images generated by the game circuitry during playing of the game;
   a control key pivotally mounted to the game housing and connected to the circuitry for moving an image on the screen by pivoting of the control key, the control key including an opening therein; and
   a mechanical joystick having first and second positions with the game with the first position being an operative position with a portion of the mechanical joystick attached in the control key opening for pivoting of the control key by operation of the mechanical joystick attached in the control key opening so that the mechanical joystick actuates the game circuitry to control movement of the image on the screen, and the second position being a stored position for the mechanical joystick with the joystick held by the housing completely detached from the control key so that the mechanical joystick cannot actuate the game circuitry to control image movement with operation of the control key controlling movement of the image on the screen.

13. The hand-held electronic game of claim 12 wherein the control key is pivotally mounted to the game housing and includes a top surface for being pushed to pivot the control key based on the portion of the top surface pushed in a direction corresponding to the desired direction of movement of the image on the screen.

14. The hand-held electronic game of claim 12 wherein the joystick includes a mounting post for being inserted in the control key opening to attach the joystick to the control key to use the joystick for controlling image movement in the joystick first position.

15. The hand-held electronic game of claim 13 wherein the joystick includes a mounting post and the control key opening is formed by a central recess in the key, and one of the joystick post and the control key recess includes a raised portion and the other of the joystick post and the control key recess includes a grooved portion in which the raised portion is received with the joystick control in its operative position.

16. A hand-held electronic game comprising:
   a housing having internal game circuitry and a display screen for viewing images generated by the game circuitry during playing of the game; and
   a control key on the game housing and connected to the circuitry for moving an image on the screen; and
   a joystick having first and second positions with the game with the first position being an operative position with the joystick attached on the control key for controlling movement of the image on the screen by operation of the joystick attached on the control key, and the second position being a stored position with the joystick held by the housing detached from the control key and operation of the control key controlling movement of the image on the screen,
   wherein the housing includes joystick mounting clips for receiving and holding the joystick in the clips to store the joystick in the joystick second position when the control key is being operated for controlling image movement.

17. The hand-held electronic game of claim 16 wherein the housing has clip receiving openings and a first half and a second half which when attached together tightly capture the mounting clips in the clip receiving openings of the housing.

18. A hand-held electronic game comprising:
   a housing having internal game circuitry and a display screen for viewing images generated by the game circuitry during playing of the game;
   a control key on the game housing and connected to the circuitry for moving an image on the screen; and
   a joystick having first and second positions with the game with the first position being an operative position with the joystick attached on the control key for controlling movement of the image on the screen by operation of the joystick attached on the control key, and the second position being a stored position with the joystick held by the housing detached from the control key and operation of the control key controlling movement of the image on the screen,
   wherein the control key includes a top surface having a central opening therein and the joystick includes a mounting post for being inserted in the control key opening to attach the joystick to the key to use the joystick for controlling image movement in the joystick first attached position, and the housing includes joystick mounting clips for receiving and holding the joystick in the clips to store the joystick when the control key is being operated for controlling image movement in the joystick second position.

19. A hand-held electronic game comprising:
   a housing having internal game circuitry and a display screen for viewing images generated by the game circuitry during playing of the game:
   a control key on the game housing and connected to the circuitry for moving an image on the screen; and
   a joystick having first and second positions with the game with the first position being an operative position with the joystick attached on the control key for controlling movement of the image on the screen by operation of the joystick attached on the control key, and the second position being a stored position with the joystick held by the housing detached from the control key and operation of the control key controlling movement of the image on the screen,
   wherein the joystick includes a mounting post and the control key includes a central recess, and one of the joystick post and the control key recess includes a raised portion and the other of the joystick post and the control key recess includes a grooved portion in which the raised portion is received with the joystick control in its operative position, and
   the joystick includes a support stand having top and bottom surfaces with the mounting post depending from the bottom surface and having ribs extending outward from the mounting post along the bottom surface of the stand, and the control key includes a top surface in which the recess is centrally formed and having slots extending outward from the central recess with the ribs seating in the slots with the joystick control in its operative position on the control key to prevent turning of the joystick control relative to the control key the raised portion received in the grooved portion. stored position with the joystick held by the housing detached from the control key and operation of the control key controlling movement of the image on the screen,
   wherein the joystick includes a mounting post and the control key includes a central recess, and one of the joystick post and the control key recess includes a raised portion and the other of the joystick post and the control key recess includes a grooved portion in which the raised portion is received with the joystick control in its operative position, and the joystick includes a support stand having top and bottom surfaces with the mounting post depending from the bottom surface and having ribs extending outward from the mounting post along the bottom surface of the stand, and the control key includes a top surface in which the recess is centrally formed and having slots extending outward from the central recess with the ribs seating in the slots with the joystick control in its operative position on the control key to prevent turning of the joystick control relative to the control key the raised portion received in the grooved portion.

* * * * *

UNITED STATES PATENT AND TRADEMARK OFFICE
CERTIFICATE OF CORRECTION

PATENT NO. : 5,976,018
DATED : November 2, 1999
INVENTOR(S) : Gil Druckman

Page 1 of 2

It is certified that error appears in the above-identified patent and that said Letters Patent is hereby corrected as shown below:

Column 10, lines 40-44, delete "the joystick control includes a mounting post depending therefrom and the control key includes a central recess for receiving the mounting post with the joystick control in its operative position, and".

Column 11, line 38, change "claim 13" to --claim 12--.

Column 12, line 32, after "game" change the colon to a semicolon.

Column 12, line 62, through column 14, line 7, after "portion." delete "stored position with the joystick held by the housing detached from the control key and operation of the control key controlling movement of the image on the screen,
"wherein the joystick includes a mounting post and the control key includes a central recess, and one of the joystick post and the control key recess includes a raised portion and the other of the joystick post and the control key recess includes a grooved portion in which the raised portion is received with the joystick control in its operative position, and

UNITED STATES PATENT AND TRADEMARK OFFICE
CERTIFICATE OF CORRECTION

PATENT NO. : 5,976,018
DATED : November 2, 1999
INVENTOR(S) : Gil Druckman

Page 2 of 2

It is certified that error appears in the above-identified patent and that said Letters Patent is hereby corrected as shown below:

"the joystick includes a support stand having top and bottom surfaces with the mounting post depending from the bottom surface and having ribs extending outward from the mounting post along the bottom surface of the stand, and the control key includes a top surface in which the recess is centrally formed and having slots extending outward from the central recess with the ribs seating in the slots with the joystick control in its operative position on the control key to prevent turning of the joystick control relative to the control key the raised portion received in the grooved portion."

Signed and Sealed this

Sixth Day of June, 2000

Attest:

Q. TODD DICKINSON

*Attesting Officer*   *Director of Patents and Trademarks*